United States Patent [19]

Gusthalin

[11] Patent Number: 5,174,027
[45] Date of Patent: Dec. 29, 1992

[54] ARRANGEMENT IN A GRASS TRIMMER

[75] Inventor: Göran O. E. Gusthalin, Lekeryd, Sweden

[73] Assignee: Aktiebolaget Electrolux, Stockholm, Sweden

[21] Appl. No.: 807,094

[22] Filed: Dec. 13, 1991

[30] Foreign Application Priority Data

Jan. 9, 1991 [SE] Sweden ................................ 9100060

[51] Int. Cl.⁵ .......................... B26B 27/00; B26B 7/00
[52] U.S. Cl. ........................................ 30/276; 30/104
[58] Field of Search ................. 30/227, 272, 276, 347, 30/104, 108

[56] References Cited

U.S. PATENT DOCUMENTS

| | | | |
|---|---|---|---|
| 969,452 | 9/1910 | Boggs | 30/104 |
| 1,499,429 | 7/1924 | Wiedke | 30/104 |
| 4,281,505 | 8/1981 | Fuelling et al. | 30/276 |
| 5,010,649 | 4/1991 | Hoffmann | 30/276 |
| 5,020,224 | 6/1991 | Haupt | 30/276 |

Primary Examiner—Douglas D. Watts
Assistant Examiner—Paul M. Heyrana, Sr.

[57] ABSTRACT

The cutting height of a grass trimmer is determined by the location of an eyelet (19) through which the cutting thread (16) extends from the coil (15) of the trimmer. According to the invention the eyelet is provided in an insert (21) accommodated in a hole of the trimmer wall. The insert can be set in at least two positions whereby the eyelet adopts different heights.

4 Claims, 2 Drawing Sheets

ARRANGEMENT IN A GRASS TRIMMER

BACKGROUND OF THE INVENTION

The present invention relates to an arrangement in a grass trimmer having a supply of cutting thread extending to a cutting position through an eyelet in the wall of the trimmer.

A trimmer of the present kind is a cutting apparatus having a rotatable body mounted on a driving shaft and guided by the user above the ground by means of a rig tube provided with handles. The cutting member comprises nylon thread wound on a coil in the trimmer and having one or a couple of ends extending through eyelets. In this area, several types of trimmers are found which are intended for different purposes such as cutting of long grass, trimming of lawn edges, and clearing away wild plants. The versatility of a trimmer is related to its equipment, but hitherto each type has been adapted for one field of application only. The object of the present invention is to provide a trimmer which is more universal and usable in a plurality of fields of application.

SUMMARY OF THE INVENTION

According to the invention, an arrangement for adjusting the cutting height of a trimmer has been provided whereby it can be used in all of the three fields mentioned above. For trimming of lawn edges the lowest cutting height of the trimmer is useful. The cutting height is determined by the position of an eyelet in the wall of the trimmer, and by adjusting the eyelet vertically various cutting heights can be obtained. The arrangement according to the invention for adjusting the eyelet comprises having the eyelet being eccentrically positioned in an insert accommodated in a hole in the wall of the trimmer and adjustable in this hole for setting the eyelet in at least two different positions, the insert cooperating with locking means for fixing the insert in the adjusted position.

BRIEF DESCRIPTION OF THE DRAWING FIGURES

FIG. 1 an elevation, partly in section, of the trimmer;
FIG. 2 an elevation taken perpendicularly to FIG. 1;
FIG. 3 is an elevation taken perpendicularly to FIG. 1, of an alternate embodiment of the invention.

DETAILED DESCRIPTION OF THE PREFERRED EMBODIMENTS

Figure 1:
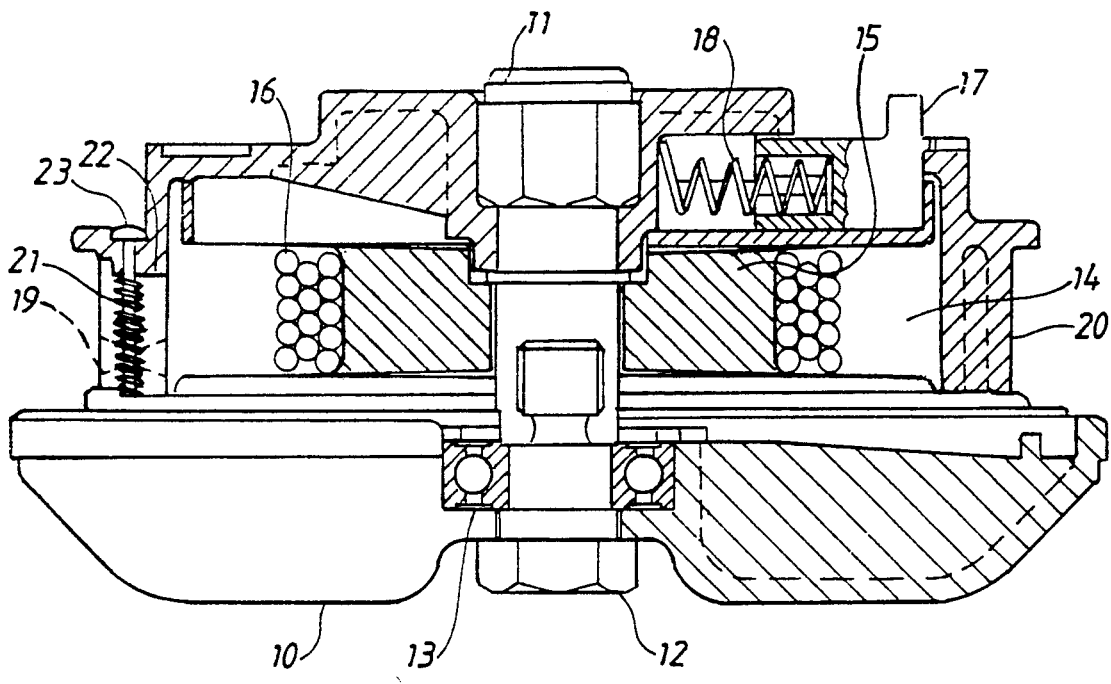

A complete trimmer comprises the parts shown in FIG. 1. The lower portion is a so-called support cup 10 screwed onto a through shaft 11. The shaft 11 has on its upper end a tapped bore accommodating the tapped end of a driving shaft to which the trimmer is connected. A bolt 12 extending through the support cup has a ball bearing 13 permitting the upper portion to rotate without rotation of the support cup. Wearing of the bottom face of the support cup is thereby avoided which during operation is moved in contact with the ground. The upper portion comprises a coil housing 14 which is rigidly connected to the shaft 11 and rotates therewith. A coil 15 is journalled on the shaft and contains nylon thread 16 constituting the cutting member of the trimmer. The coil is normally held in the coil housing by a releasable latch 17, but when the latch is released against the action of a spring 18 the coil is free to rotate on the shaft and thread can be pulled off from the coil. When the trimmer is used the latch should be in its operative position as shown in FIG. 1.

A piece of the thread suitable for cutting is pulled out through an eyelet 19 in the wall 20 of the coil housing. The eyelet 19 is an excentric opening in a circular disc 21 that is mounted in a hole 22 in the wall. When the disc is rotated in the hole the vertical position of the eyelet 19 is adjusted so as to be movable from the lowermost position in FIG. 1 to a top position diametrically opposite to the shown position. A means for adjusting the disc is shown which comprises a set screw 23 accommodated in a vertical bore in the wall adjacent the disc. The latter is provided with teeth along its periphery which are threadedly engaged with the screw. When the screw is rotated the teeth and the screw thread operate as a worm gear transmitting the movement of the screw to the disc. The screw can be made slowly movable in its bore so as to brake any self-adjustment of the disc. The disc is thereby latched in each adjusted position. The head of the screw is preferably made such as to be engaged by a screw tool.

Figure 2:
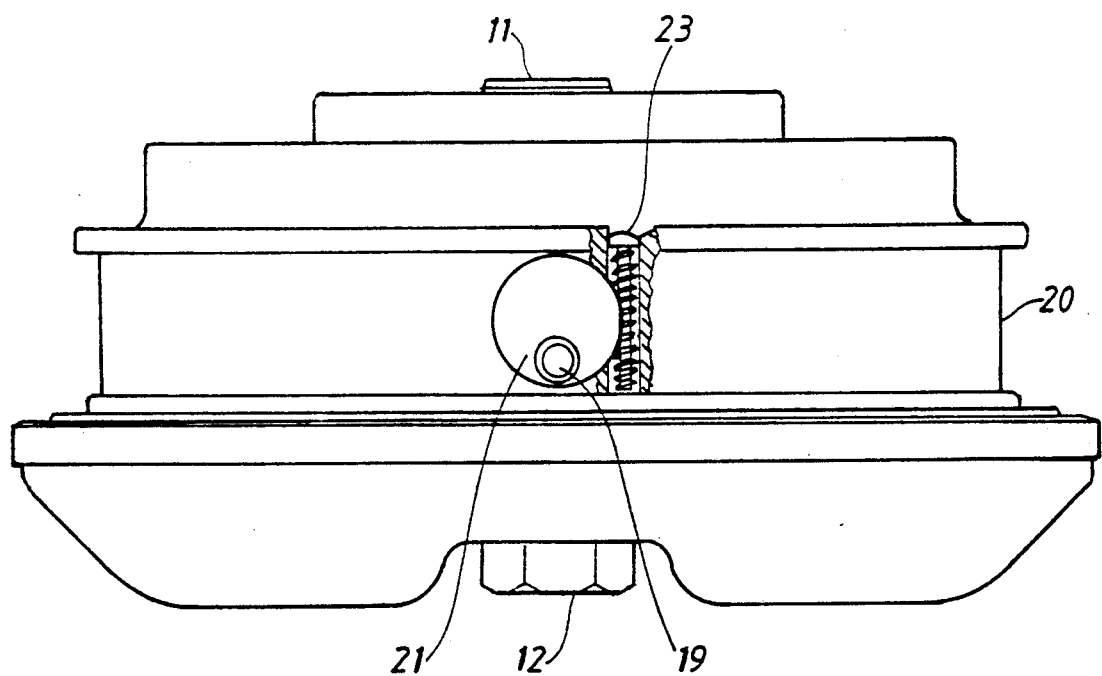
Figure 3:
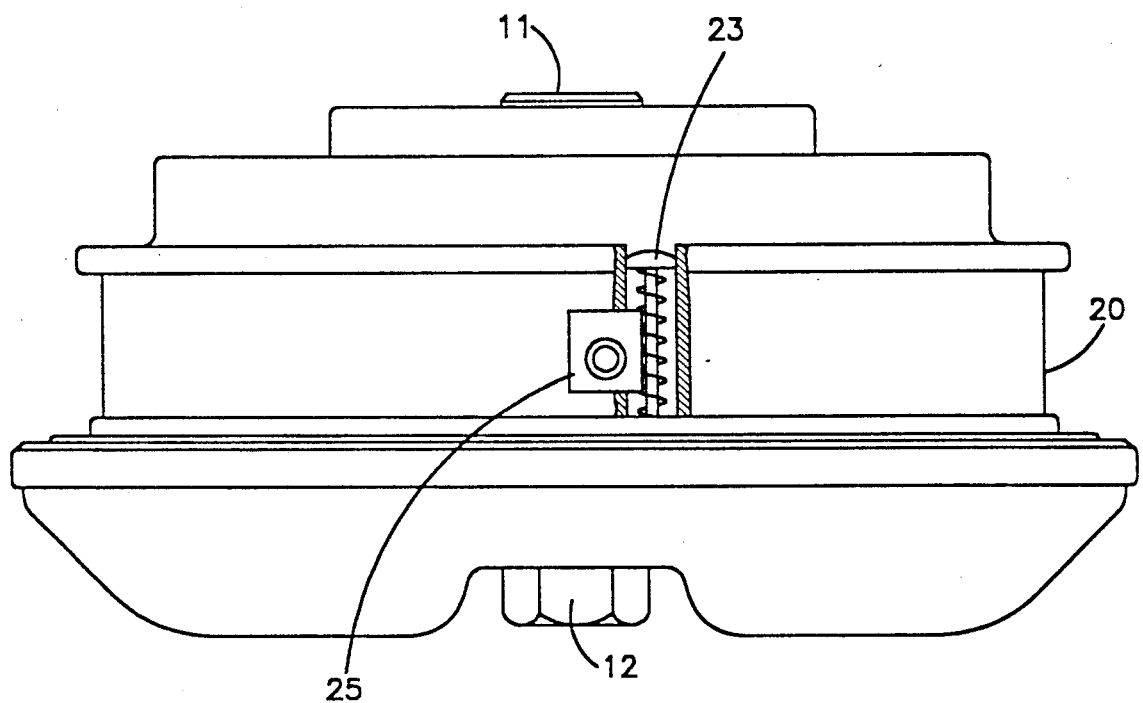

In a more simple embodiment of the adjustment as shown in FIG. 3, the circular disc 21 of FIG. 2 has been replaced by a rectangular disc 25 having no teeth but only a circumferential groove. The screw 23 engages this groove and locks the disc 25 in a fixed position in the hole 22. In order to release the disc 25 for adjustment to another position the screw must be removed and then put back again after setting the disc in a new position.

The shown embodiments are examples of implementing the invention. The disc provided with the eyelet could have some other shape, and with the eyelet provided at one end thereof the disc can be inserted in two different positions, one for high cutting height, and one for low.

I claim:

1. Arrangement in a grass trimmer having a supply (15) of cutting thread (16) extending to a cutting position through an eyelet (19) in the wall of the trimmer, characterized in that said eyelet is excentrically positioned in an insert (21) accommodated in a hole (22) in the wall of the trimmer and adjustable in this hole for setting eyelet in at least two different positions, said insert cooperating with locking means (23) for fixing the insert in the adjusted position.

2. Arrangement according to claim 1, characterized in that the insert comprises a circular disc provided with teeth at its periphery, the locking means comprising a screw in the wall of the trimmer and having threads engaging said teeth whereby the disc is rotatable by means of the screw.

3. Arrangement according to claim 2, characterized in that the teeth of the disc and the threads of the screw form a worm gear and that the screw is guided in the wall to obtain the locking function.

4. Arrangement according to claim 1, characterized in that the insert comprises a rectangular disc provided with grooves along its long sides and that the locking means comprises a screw inserted in the wall of the trimmer and engaging said disc in one of said grooves.

* * * * *

UNITED STATES PATENT AND TRADEMARK OFFICE
CERTIFICATE OF CORRECTION

PATENT NO. : 5,174,027

DATED : December 29, 1992

INVENTOR(S) : Goran Otto Emanuel Gusthalin

It is certified that error appears in the above-identified patent and that said Letters Patent is hereby corrected as shown below:

```
Column 2, Claim 1, line 47, delete "setting eyelet" and
      insert --setting said eyelet--.
```

Signed and Sealed this

Seventh Day of December, 1993

*Attest:*

BRUCE LEHMAN

*Attesting Officer*        *Commissioner of Patents and Trademarks*